US007027439B1

(12) United States Patent
Barrow et al.

(10) Patent No.: US 7,027,439 B1
(45) Date of Patent: Apr. 11, 2006

(54) DATA STORAGE SYSTEM WITH IMPROVED NETWORK INTERFACE

(75) Inventors: Jonathan J. Barrow, Canton, MA (US); Kendell A. Chilton, Southborough, MA (US)

(73) Assignee: EMC Corporation, Hopkinton, MA (US)

( * ) Notice: Subject to any disclaimer, the term of this patent is extended or adjusted under 35 U.S.C. 154(b) by 891 days.

(21) Appl. No.: 09/852,580

(22) Filed: May 10, 2001

(51) Int. Cl.
  *H04L 12/56* (2006.01)
(52) U.S. Cl. ............... 370/389; 370/463; 709/203; 709/217
(58) Field of Classification Search ............... 370/389, 370/392, 395.72; 709/200, 201, 203, 213, 709/217, 218, 219
  See application file for complete search history.

(56) References Cited

U.S. PATENT DOCUMENTS

| 6,718,372 | B1 * | 4/2004 | Bober ........................ 709/217 |
| 6,748,448 | B1 * | 6/2004 | Barrera et al. ............... 709/245 |
| 2001/0023460 | A1 | 9/2001 | Boucher et al. ............ 709/250 |
| 2002/0004796 | A1 * | 1/2002 | Vange et al. ................ 709/217 |
| 2002/0078292 | A1 * | 6/2002 | Chilton ..................... 710/305 |

FOREIGN PATENT DOCUMENTS

| EP | 0 515 760 A1 | 12/1992 |
| JP | 2000-148566 | 5/2000 |
| JP | 2000-267907 | 9/2000 |

OTHER PUBLICATIONS

British Search Report from Application No. GB 0210551.8, filed Nov. 21, 2002, 1 Page.
Geoffray P; "OPIOM: Off-Processor I/O with Myrinet", Future Generation Computer Systems, v 18, n4, pp. 491-499, Mar. 2002, ISSN 0167-739X.

* cited by examiner

*Primary Examiner*—Chi Pham
*Assistant Examiner*—Anh-Vu Ly
(74) *Attorney, Agent, or Firm*—BainwoodHuang; David E. Huang, Esq.

(57) ABSTRACT

A data storage system has a backplane, processing circuitry and a NIC. The processing circuitry is physically connected to the backplane, and can perform block-based data access operations. The NIC has a first port that that couples to an external network, a second port that physically connects to the backplane, and control circuitry interconnected between the first port and the second port. The control circuitry can (i) receive file-based communications from the external network through the first port and provide block-based communications to the processing circuitry through the second port and the backplane in response to the file-based communications, (ii) receive block-based communications from the processing circuitry through the second port and the backplane and provide file-based communications to the external network through the first port in response to the block-based communications, and (iii) provide application server resources to operate as an application server that runs application-level programs.

22 Claims, 7 Drawing Sheets

DATA STORAGE SYSTEM WITH IMPROVED NETWORK INTERFACE

BACKGROUND OF THE INVENTION

Typically, a data storage system operates as a large storage device for one or more external server computers (or simply servers) by responding to block-based input/output (I/O) requests that direct the data storage system to perform load and store operations. Examples of block-based communications include Block Mux Channel communications, Small Computer Systems Interface (SCSI) commands, Fibre Channel communications, Enterprise System Connection (ESCON) signals, Fibre Connectivity (FICON) Channel communications, and the like.

A typical server provides services (e.g., client-oriented access to a data storage system) to one or more other computers called clients. In contrast to block-based communications which servers and data storage systems typically use to communicate with each other, clients and servers typically communicate with each other using client-oriented and server-oriented communications (hereinafter, generally referred to as client-oriented communications). Examples of client-oriented communications include Transmission Control Protocol/Internet Protocol (TCP/IP) communications, Gigabit Ethernet signals, Asynchronous Transfer Mode (ATM) communications, and the like.

In one configuration, a client can retrieve data from a data storage system by sending a client-oriented request (e.g., a TCP/IP signal) to a server (i.e., a host). The server then provides a block-based request (e.g., a SCSI signal) for one or more blocks of data to the data storage system. Next, the data storage system provides the requested data blocks (e.g., a SCSI signal) to the server in response to the block-based request. The server provides that data to the client I the form of a file-based response (e.g., a TCP/IP signal). Further details of this configuration will now be provided with reference to FIG. 1.

Figure 1:
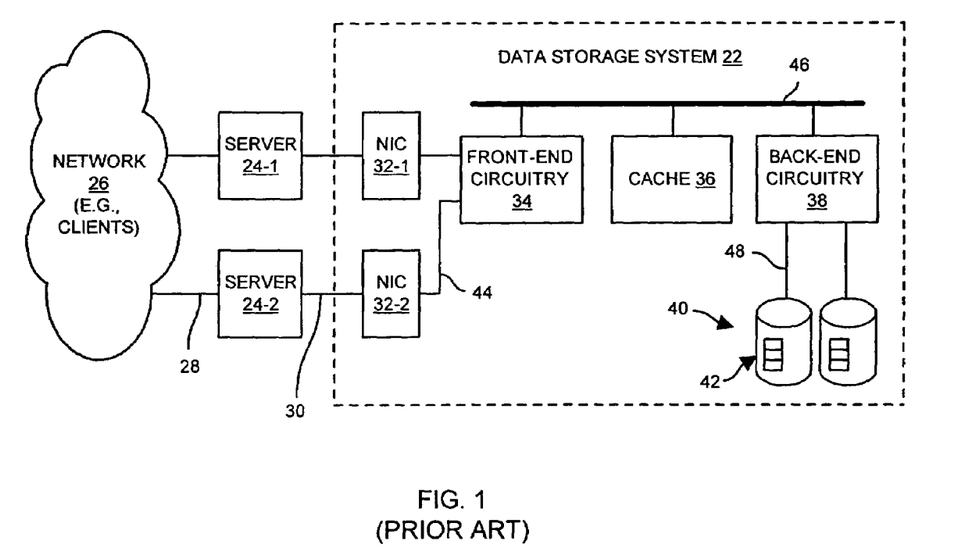
FIG. 1 is a block diagram of a conventional data storage system which includes network interface cards that provide block-based communications to external servers.

FIG. 1 shows a conventional configuration 20 having a data storage system 22, servers 24-1, 24-2 (collectively, servers 24), an external network 26 (e.g., the Internet), a transmission medium 28 that connects the servers 24 to the external network 26, and a transmission medium 30 that connects the servers 24 to the data storage system 22.

The servers 24 provide data storage services to devices of the external network 26 (e.g., clients) by operating as a front-end to the data storage system 22. For example, the servers 24 can load and store blocks of data within the data storage system 22 in response to file-based commands (i.e., provide file-based access to blocks of data within the data storage system 22). Moreover, the servers 24 can operate as database engines which access respective databases within the data storage system 22. As such, a client can send a file-based communication (e.g., a database query in the form of a TCP/IP signal) to one of the servers 24 through the transmission medium 28 to access a database of the data storage system 22. In response to the file-based communication, that server 24 can send one or more block-based commands (e.g., Fibre Channel signals) to the data storage system 22 through the transmission medium 30 to retrieve and query that database, and then provide query results back to the client.

As shown in FIG. 1, the data storage system 22 includes a set of network interface cards 32-1, 32-2 (NICs 32), front-end circuitry 34, a cache 36, back-end circuitry 38 and a set of disk drives 40 having blocks 42 for storing data. The data storage system 22 further includes a set of connections 44 which connects the NICs 32 to the front-end circuitry 34. Additionally, the data storage system 22 includes a bus 46 that connects the front-end circuitry 34, the cache 36 and the back-end circuitry 38 together. Furthermore, the data storage system 22 includes a set of connections 48 that connects the back-end circuitry 38 and the set of disk drives 40 together.

In general, the cache 36 operates as a buffer for data exchanged between the servers 24 and the set of disk drives 40. Additionally, the front-end circuitry 34 operates as an interface between the servers 24 and the cache 36. Similarly, the back-end circuitry 38 operates as an interface between the cache 36 and the set of disk drives 40.

When a NIC 32 receives a block-based signal from a server 24, that NIC 32 conveys that block-based signal to the front-end circuitry 34. This conveyance typically involves changing the format of the signal, e.g., receiving a serial fiber optic signal from the server 34 and converting it into parallel-bus electrical signals for use by the front-end circuitry 34, or vice versa. For example, when a server 24 writes data to the data storage system 22, a NIC 32 receives and converts that data into a format suitable for use by the front-end circuitry 34, and then provides that data to the front-end circuitry 34 (e.g., from a serial fiber optic signal to an electrical signal for a parallel bus). The front-end circuitry 34 then buffers the data in the cache 36 and notifies the back-end circuitry 38 of the arrival of the data. The back-end circuitry 38 then copies the data from the cache 36 to the set of disk drives 40.

To read data from the data storage system 22, the server 24 sends a block-based read command to the data storage system 22. A NIC 32 converts the read command into a format suitable for use by the front-end circuitry 34, and then provides that that command to the front-end circuitry 34 (e.g., from a serial fiber optic signal to an electrical signal for a parallel bus). Next, the front-end circuitry 34 notifies the back-end circuitry 38 of the command. In response, the back-end circuitry 38 transfers a copy of the data from the set of disk drives 40 to the cache 36. The front-end circuitry 34 then transfers the data from the cache 36 to the server 24 through the NIC 32 which provides the data in a format (e.g., a fiber optic signal) which is suitable for use by the server 24.

SUMMARY OF THE INVENTION

Unfortunately, there are deficiencies to the above-described conventional configuration 20 of FIG. 1. For example, the servers 24 of the configuration 20 can be expensive. Nevertheless, in order to utilize the data storage system 22 in a file-based communication environment (e.g., a TCP/IP environment), the configuration 20 requires one or more servers 24 to operate as a front-end to the data storage system 22. As such, the servers 24 translate file-based data access commands, e.g., network file system (NFS) commands which access data by filename, into block-based communications (e.g., SCSI commands) which access data at a block level (e.g., disk, track, and sector numbers).

Additionally, the presence of the servers 24 provides another stage, or hop, for data to pass through (i.e., between the network 26 and the set of disk drives 40) thus adding some latency in moving data between the network 26 and the set of disk drives 40. Other stages include the NICs 32, the front-end circuitry 34, the cache 36, and the back-end circuitry 38.

Furthermore, when there are multiple servers 24 operating as a front-end to the data storage system 22, the operation of the multiple servers 24 is typically not well-coordinated.

That is, the servers 24 typically act independently of each other (e.g., provide access to respective databases in the data storage system 22). For example, there is the possibility for one server 24 to be overworked while the other server 24 is underutilized.

In contrast to the above-described conventional configuration 20 which uses servers 24 as a front-end to a conventional data storage system 20, the present invention is directed to data storage system techniques which utilize a network interface card (NIC) that is capable of operating as (i) an interface between file-based and block-based communications, and (ii) an application server that runs application-level programs.

Since the NIC is capable of operating as an interface between file-based and block-based communications, there is no need for an external server (e.g., see the conventional servers 24 required by the conventional configuration 20 of FIG. 1) to translate file-based communications to block-based communications, and vice versa.

Additionally, since the NIC is capable of operating as an application server that runs application-level programs, the data storage system can perform server operations (e.g., operate as a database engine that performs database queries). Accordingly, for a data storage system utilizing such a NIC, there is no need for one or more external servers (e.g., the conventional servers 24 of FIG. 1) to operate as a front-end to the data storage system.

One arrangement of the invention is directed to a data storage system having a backplane, processing circuitry and a NIC. The processing circuitry is physically connected to the backplane, and is configured to perform block-based data access operations. The NIC has a first port that is capable of coupling to an external network, a second port that is physically connected to the backplane, and control circuitry interconnected between the first port and the second port. The control circuitry is configured to: (i) receive file-based communications from the external network through the first port and provide block-based communications to the processing circuitry through the second port and the backplane in response to the file-based communications, (ii) receive block-based communications from the processing circuitry through the second port and the backplane and provide file-based communications to the external network through the first port in response to the block-based communications, and (iii) provide application server resources to operate as an external server that runs application-level programs. Since the control circuitry of the NIC is configured to operate as an application server, there is no need for an external front-end server such as that which is required in conventional configurations (e.g., see the conventional servers 24 for the conventional data storage system 20 of FIG. 1).

In one arrangement, the control circuitry includes a section of circuit board material and a processor which is physically mounted to the section of circuit board material. The processor is configured to mediate the transfer of data between the first and second ports (e.g., align and steer data, etc.). The second port includes a backplane connector which is physically mounted to the section of circuit board material, and the backplane connector is capable of mating with the backplane of the data storage system. Accordingly, the control circuitry can directly connect to the backplane and thus reside in the same computer cabinet as the processing circuitry of the data storage system. As such, the control circuitry can leverage off of the same system resources utilized by the processing circuitry of the data storage system (e.g., the same power supply, the same fan assembly, etc.).

In one arrangement, the control circuitry further includes memory which is physically mounted to the section of circuit board material. The memory is configured to buffer data moving between the first and second ports when the first port couples to the external network and the backplane connector mates with the backplane of the data storage system. Accordingly, the control circuitry can manipulate or format the data by utilizing the memory (e.g., convert from serial to parallel, align the data into larger data types or blocks, etc.).

In one arrangement, the second port includes (i) a set of data pathway conductors that forms, between the control circuitry and the processing circuitry, a portion of a data pathway to carry data for storage within the data storage system, and (ii) a set of message pathway conductors that forms, between the control circuitry and the processing circuitry, a portion of a message pathway to carry messages for controlling storage of the data. In this arrangement, there are separate pathways for data and messages thus providing faster and better-organized throughput.

In one arrangement, the set of data pathway conductors forms, between the control circuitry and the processing circuitry, a portion of a Fibre Channel bus. This arrangement enables the control circuitry to communicate with the processing circuitry through a Fibre Channel pathway. If the processing circuitry is already equipped to handle Fibre Channel communications (e.g., the processing circuitry can include conventional directors which were designed to communicate via Fibre Channel signals with an external server through a conventional NIC), then no modifications need to be made to the processing circuitry in order for the processing circuitry to communicate with the NIC that is further capable of operating as an application server.

In one arrangement, the control circuitry is configured to exchange (i) Internet Protocol communications with the external network through the first port, and (ii) block-based communications with the processing circuitry of the data storage system through the second port and the backplane of the data storage system. In this arrangement, the control circuitry preferably includes a map which maps filenames with blocks of a set of data storage devices of the data storage system. Additionally, the control circuitry preferably is further configured to receive a file-based Internet Protocol data access request from the external network and to access a block of data within the data storage system based on the file-based Internet Protocol data access request and the map. Accordingly, the data storage system can directly connect to an IP network (e.g., the Internet).

In one arrangement, the control circuitry is configured to operate as a processor of a multiprocessor system which simultaneously performs multiple application-level operations. Preferably, the control circuitry includes a hardware circuit that associates, with each application-level operation, a number that distinguishes that application-level operation among the multiple application-level operations simultaneously performed by the multiprocessor system. Accordingly, the data storage system can include multiple processors (e.g., multiple NICs) which are configured to operate in a multiprocessing manner and perform application-level operations (e.g., operate as a multiprocessing database engine, a multiprocessing website, etc.).

The features of the invention, as described above, may be employed in data storage systems, devices and methods as well as other computer-related components such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to data storage system techniques which utilize a network interface card (NIC) that is capable of operating as (i) an interface between file-based and block-based communications, and (ii) an application server that runs application-level programs. There is no need for an external server to translate file-based communications to block-based communications and vice versa since the NIC is capable of operating as an interface between file-based and block-based communications. Additionally, the data storage system can perform application-level operations (e.g., operate as a database engine that performs database queries) since the NIC is capable of operating as an application server that runs application-level programs. Accordingly, for a data storage system utilizing such a NIC, there is no need for one or more external servers to operate as a front-end to the data storage system (e.g., as required by the conventional data storage system configuration 20 of FIG. 1).

Figure 2:
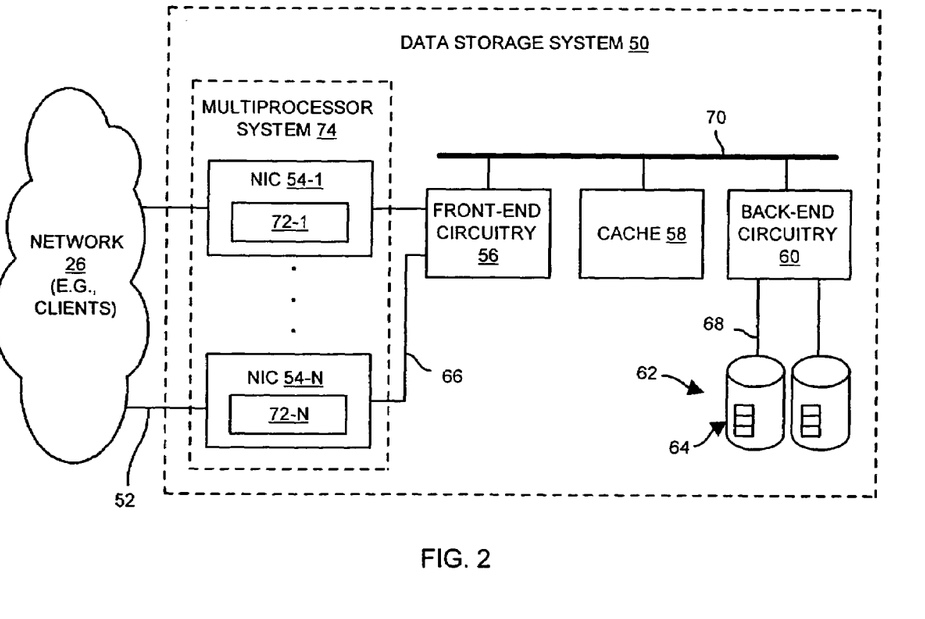
FIG. 2 is a block diagram of a data storage system which, in accordance with an embodiment of the invention, includes network interface cards that are capable of (i) providing file-based communications to an external network and (ii) operating as application servers.

FIG. 2 shows a data storage system 50 which is suitable for use by the invention. The data storage system 50 is capable of connecting directly to an external network 26 (e.g., also see FIG. 1) through a connection medium 52. The data storage system 50 includes a set of NICs 54-A, . . . , 54-N (collectively, NICs 54), front-end circuitry 56, a cache 58, back-end circuitry 60, and a set of storage devices 62 which is capable of storing data in blocks 64. The data storage system 50 further includes a set of connections 66 which connect the NICs 54 to the front-end circuitry 56, and another set of connections 68 which connect the back-end circuitry 60 to the set of storage devices 62. Additionally, the data storage system 50 includes a bus 70 which connects the front-end circuitry 56, the cache 58, and the back-end circuitry 60 together.

Each NIC 54 includes, among other things, control circuitry 72 which can operate as an interface between file-based and block-based communications, as well as provide application server resources for running application-level programs. In one arrangement, the control circuitry 72 of each NIC 54 is configured to operate as a processor of a multiprocessor system 74 which can simultaneously perform multiple application-level operations.

In contrast to conventional data storage systems (e.g., the data storage system 22 of FIG. 1), the data storage system 50 of FIG. 2 does not require an external server operating as a front-end to the data storage system 50 since the control circuitry 72 of each NIC 54 can operate as an interface between file-based and block-based communications (e.g., an NFS server). Accordingly, the cost of providing one or more external servers for the data storage system 50 can be avoided.

Additionally, the absence of an external server operating as the front-end to the data storage system 50 avoids placing an extra hop or stage between the network 26 and the data storage system 50 through which the data must pass. With fewer hops, there can be less latency in moving data between the network 26 and the set of storage devices 62.

Also, the set of NICs 54 provide for increased reliability. For example, the NICs 54 can be configured so that if one NIC 54 fails, another NIC 54 steps in to handle operations that otherwise would have been performed by the failing NIC 54. As another example, the data storage system 50 may include fault tolerant hardware such as redundant power supplies, and the NICs 54 can leverage off of such hardware (e.g., be powered by the redundant power supplies, and be protected against failure of a power supply, etc.).

Furthermore, the operation of the control circuitry 72 of each NIC 54 can be coordinated. For example, the control circuitry 72 of the NICs 54 can form the multiprocessor system 74. Accordingly, the data storage system 50 can provide multiprocessing server features such as load balancing, and fault tolerance. Further details of the invention will now be provided with reference to FIG. 3.

Figure 3:
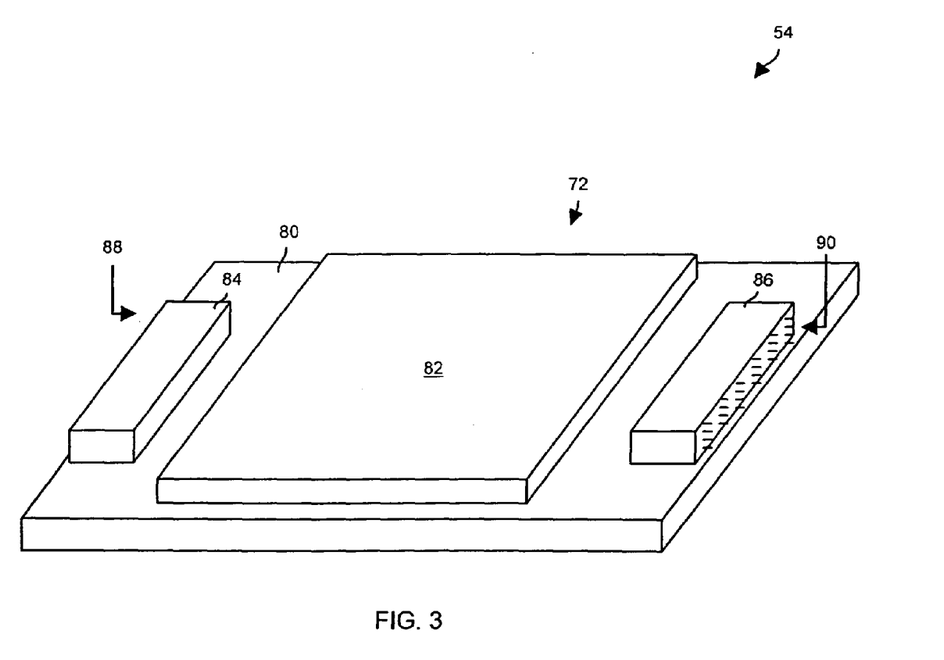
FIG. 3 is a perspective view of a network interface card of the data storage system of FIG. 2.

FIG. 3 shows a perspective view of one of the NICs 54 of FIG. 2. As shown, the NIC 54 includes control circuitry 72 having a section of circuit board material 80 (e.g., layers of conductive and nonconductors material) and a set of circuit board components 82 (e.g., integrated circuits, resisters, capacitors, etc.) which mount to the section of circuit board material 80 (e.g., using solder, press-fit pins, etc.). The NIC 54 further includes a port 84 for connecting to the external network 26, and a port 86 for connecting to the front-end circuitry 56 (also see FIG. 2). The port 84 includes a connector interface 88 (e.g., a connector for Gigabit Ethernet communications) that mates with the connection medium 52 of FIG. 2. Similarly, the port 86 includes a connector interface 90 (e.g., a backplane connector) that mates with the set of connections 66 of FIG. 2. Further details of the invention will now be provided with reference to FIG. 4.

Figure 4:
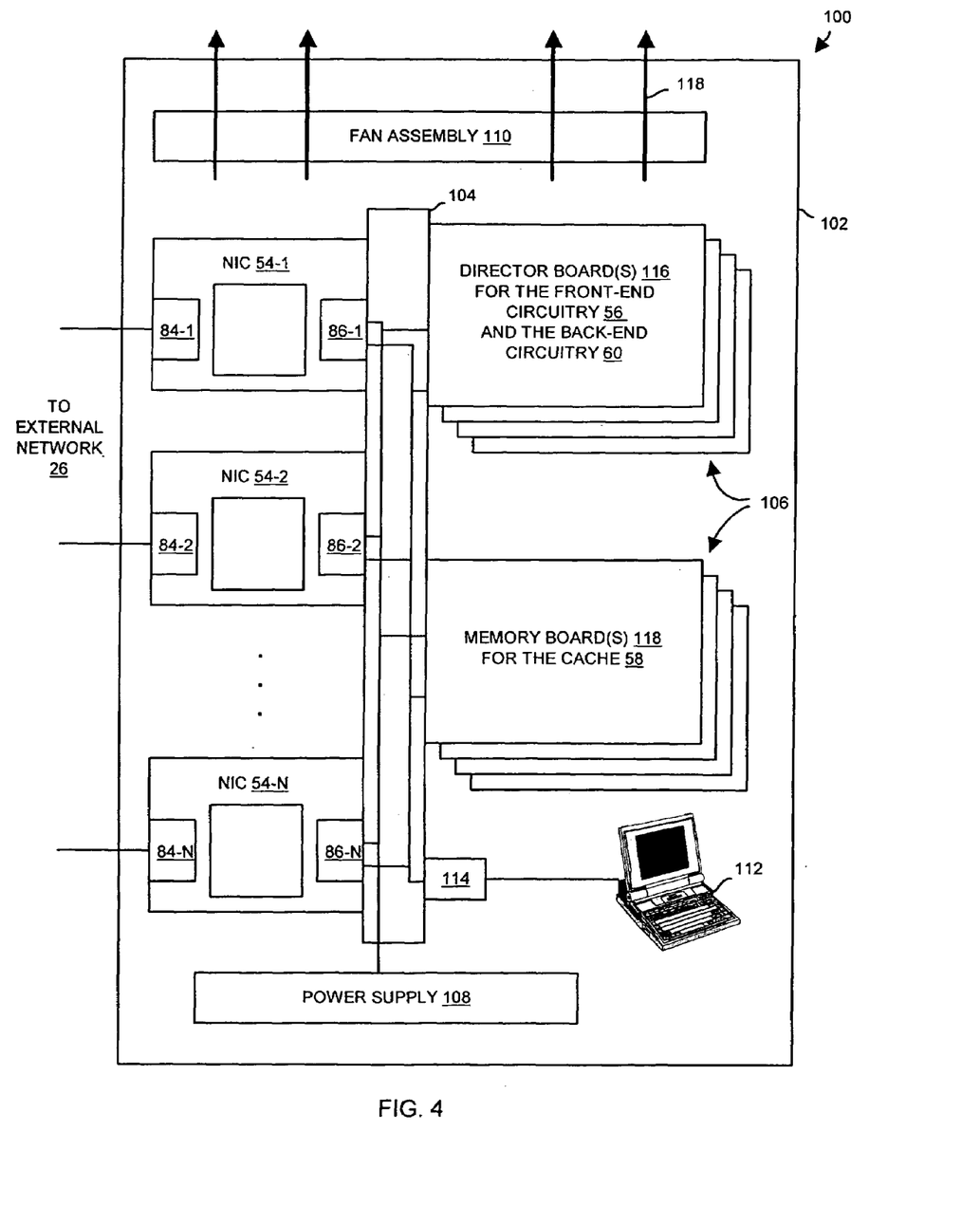
FIG. 4 is block diagram of particular portions of the data storage system of FIG. 2.

FIG. 4 is a block diagram 100 of particular portions of the data storage system 50 of FIG. 2. As shown, the data storage system 50 includes a computer cabinet 102, a backplane 104, processing circuitry 106, a power supply 108, a fan assembly 110, and input/output (I/O) device 112 (e.g., a console), an I/O connector 114 for connecting the I/O device to the backplane 104, and the earlier-described NICs 54.

The backplane 104 includes the set of connections 66 and the bus 70 of FIG. 2. The NICs 54 directly attach to the backplane 104. In particular, as shown in FIG. 4, the ports 86 of the NICs 54 physically and electrically connect to the backplane 104 (e.g., to corresponding connectors of the backplane 104).

The processing circuitry 106 includes a set of director boards 116 which forms the front-end circuitry 56 and the back-end circuitry 60, and a set of memory boards 118 which forms the cache 58 (also see FIG. 2). In a manner similar to the NICs 54, the director boards 116 and the memory boards 118 physically and electrically connect to the backplane 104 as well. The director boards 116 form the front-end circuitry 56 and the back-end circuitry 60 of the data storage system 50 (also see FIG. 2). The memory boards 118 form the cache 58 (see FIG. 2).

The path for data stored by the data storage system 50 will now be described. The director boards 116, which form the front-end circuitry 56, store data by obtaining the data from the NICs 54 through the backplane 104 and providing it to the memory boards 118 through the backplane 104. The director boards 116, which form the back-end circuitry 60, then complete the data storage process by obtaining the data from the memory boards 118 through the backplane 104 and providing it to the data storage devices 62.

The path for data retrieved by the data storage system 50 will now be described. The director boards 116, which form the back-end circuitry 60, retrieve data by obtaining the data from the data storage devices 62 and providing it to the memory boards 118 through the backplane 104. Then, the director boards 116, which form the front-end circuitry 56, complete the data retrieval process by obtaining the data from the memory boards 118 through the backplane 104 and providing it to the NICs 54 through the backplane 104.

It should be understood that the director boards 116 can be conventional director boards that are also suitable for use by a conventional data storage system. For example, suppose that the conventional data storage system 22 of FIG. 1 uses director boards which communicate with the external servers 24 using Fibre Channel signals. The conventional director boards of the data storage system 22 can be used in the data storage system 50 of FIGS. 2 through 4 as well. To this end, the ports 86 of the NICs 54 can be configured to use the same signal format (e.g., Fibre Channel signals) as the conventional director boards thus alleviating the need to modify the director boards. Accordingly, the invention can leverage off of existing data storage system equipment and minimize the additional time and costs associated with modifying existing director boards.

As shown in FIG. 4, the power supply 108 supplies power for the set of director boards 116, the set of memory boards 118 and the NICs 54 through the backplane 104. The power supply 108 further supplies power to the fan assembly 110 (the power supply connection to the fan assembly not being shown in FIG. 4 for simplicity). As a result, the fan assembly 110 provides an air stream 118 which flows through the computer cabinet 102 to remove heat generated by the set of director boards 116, the set of memory boards 118 and the NICs 54.

The I/O device 112 provides access to various devices in the data storage system 50 such as the NICs 54 and the director boards 116. Accordingly, a user (e.g., a technician on-site) can monitor and/or control the operation of the data storage system 50 directly as an alternative to accessing the data storage system 50 through an external device (e.g., a client) over the external network 26.

Since the NICs 54, which are capable of operating as application servers, physically connect to the backplane 104 and reside in the same computer cabinet 102 as the data storage system processing circuitry 106, the application server feature essentially leverages off of the same resources as the data storage system processing circuitry 106. For example, the NICs 54 (i.e., the application servers) utilize the same power supply 108 and the same fan assembly 118. Additionally, they are enclosed and physically protected in the same cabinet 102 and sit on the same floor space as the rest of the data storage system components. Accordingly, the additional resources (e.g., floor space, cost, etc.) associated with an external server can be avoided using the data storage system 50. Further details of the invention will now be provided with reference to FIG. 5.

Figure 5:
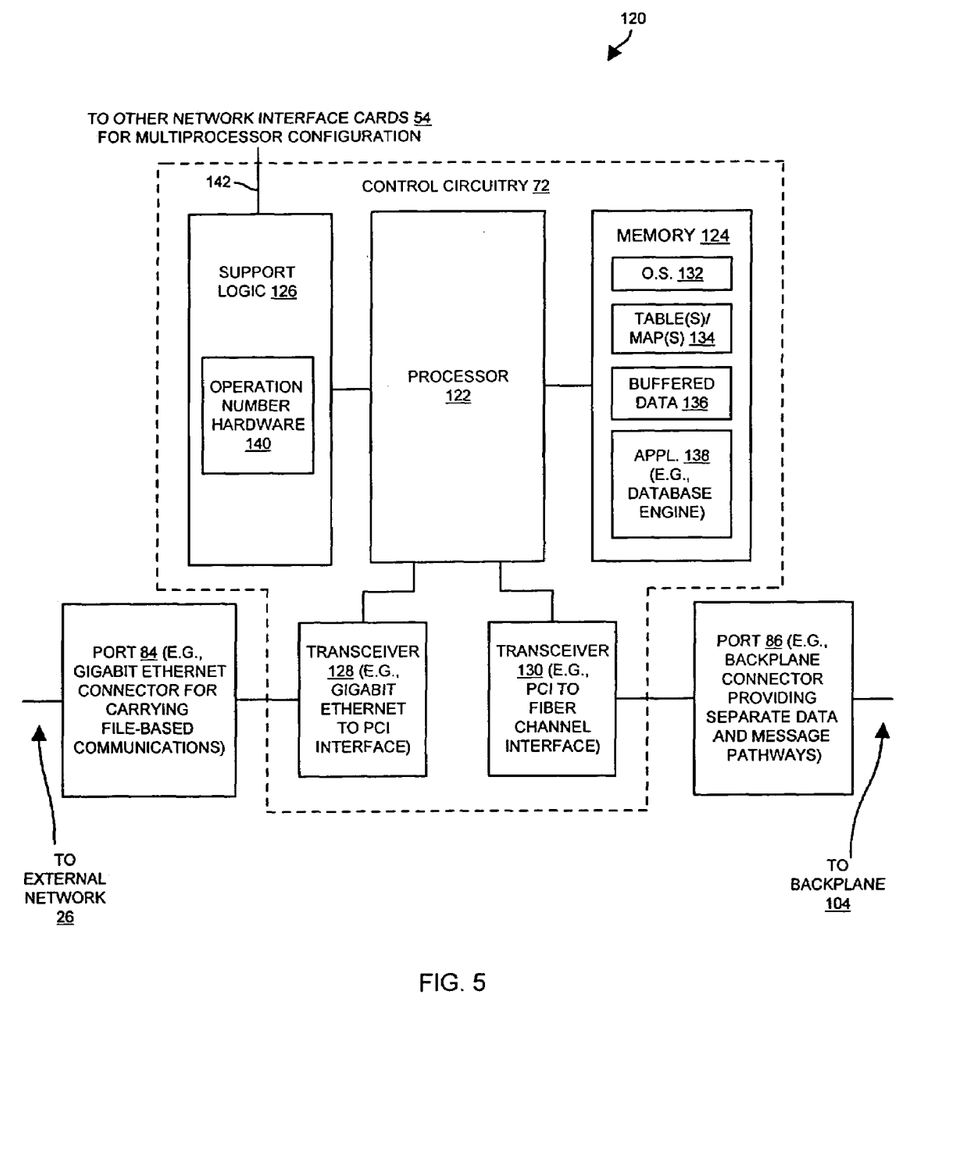
FIG. 5 is a block diagram of particular portions of the network interface card of FIG. 3.

FIG. 5 is a block diagram 120 of particular portions of a NIC 54 of FIGS. 2 through 4. As shown, the control circuitry 72 includes a processor of 122, memory 124, support logic 126, a transceiver 128 leading to the port 84, and another transceiver 130 leading to the port 86. The memory 124 stores an operating system 132, a set of tables (or maps) 134, buffered data 136 and a set of applications 138. The support logic 126 includes hardware 140 for generating operation numbers. Preferably, the support logic 126 further includes a connection 142 for communicating directly with the support logic 126 of other NICs 54.

The set of tables 134 include mapping information similar to that used by a conventional external server to map files (e.g., UNIX files) to block locations on disk drives. In particular, the set of tables 134 include mapping information for mapping files to the blocks 64 of the set of storage devices 62 (see FIG. 2). Accordingly, the NIC 54 has the capability to cross reference files identified by file-based communications with disk drives and sectors identified by block-based communications.

By way of example only, the port 84 includes a Gigabit Ethernet connector for carrying file-based communications between the control circuitry 72 and the external network 26. Also, by way of example, the port 86 includes a backplane connector for carrying data (e.g., Fibre Channel communications) and messages (e.g., control commands) between the control circuitry 72 and the director boards 116 (which form the front-end circuitry 56) through the backplane 104 (also see FIG. 4 and FIG. 2).

In one arrangement, the port 86 defines (i) a portion of a data pathway for carrying the data, and (ii) a portion of a separate message pathway for carrying the messages. In this arrangement, the communications through the port 86 are faster (i.e., higher throughput) and better-organized than another arrangement in which the data and messages are carried over the same pathway.

When the NIC 54 is in operation, the processor 122 operates in accordance with the operating system 132 to (i) handle both file-based and block-based communications, and (ii) provide application server resources for running application-level programs. In particular, the processor 122 handles file-based communications (e.g., file access commands) from the external network 26 through the port 84 and the transceiver 128, and handles block-based communications (e.g., block load and store commands) from the data storage system processing circuitry 106 through the port 86 and the transceiver 130. In order to convert data between the file-based communications and the block-based communications, the processor 122 temporarily buffers the data 136 in the memory 124. Additionally, the processor 122 runs the application 138 (e.g., a database engine) thus performing server-level operations (e.g., database queries).

It should be understood that the operation of the control circuitry 72 of the NIC 54 can be coordinated with the operation of other processors (e.g., the control circuitry 72 of other NICs 54) in order to form the multiprocessor system 74 of FIG. 2. To enable this multiprocessing system to perform multiple operations simultaneously in a coordinated manner, the support logic 126 of the control circuitry 72 of each NIC 54 associates an operation number with each operation performed by the multiprocessing system. In particular, the operation number hardware 140 communicates with other similar hardware 140 of other NICs 54 to assign a distinguishing operation number to each operation performed by the multiprocessing system (i.e., a number that is unique to the data storage system 50 at any given time). Accordingly, the multiprocessing system can track and coordinate multiple operations simultaneously (e.g., transfer operations from one processor to another and remotely track those operations using operations numbers that are unique throughout the entire multiprocessing system) and avoid operation conflicts (e.g., locking, test-and-set, and semaphore issues). Further details of the invention will now be provided with reference to FIG. 6.

Figure 6:
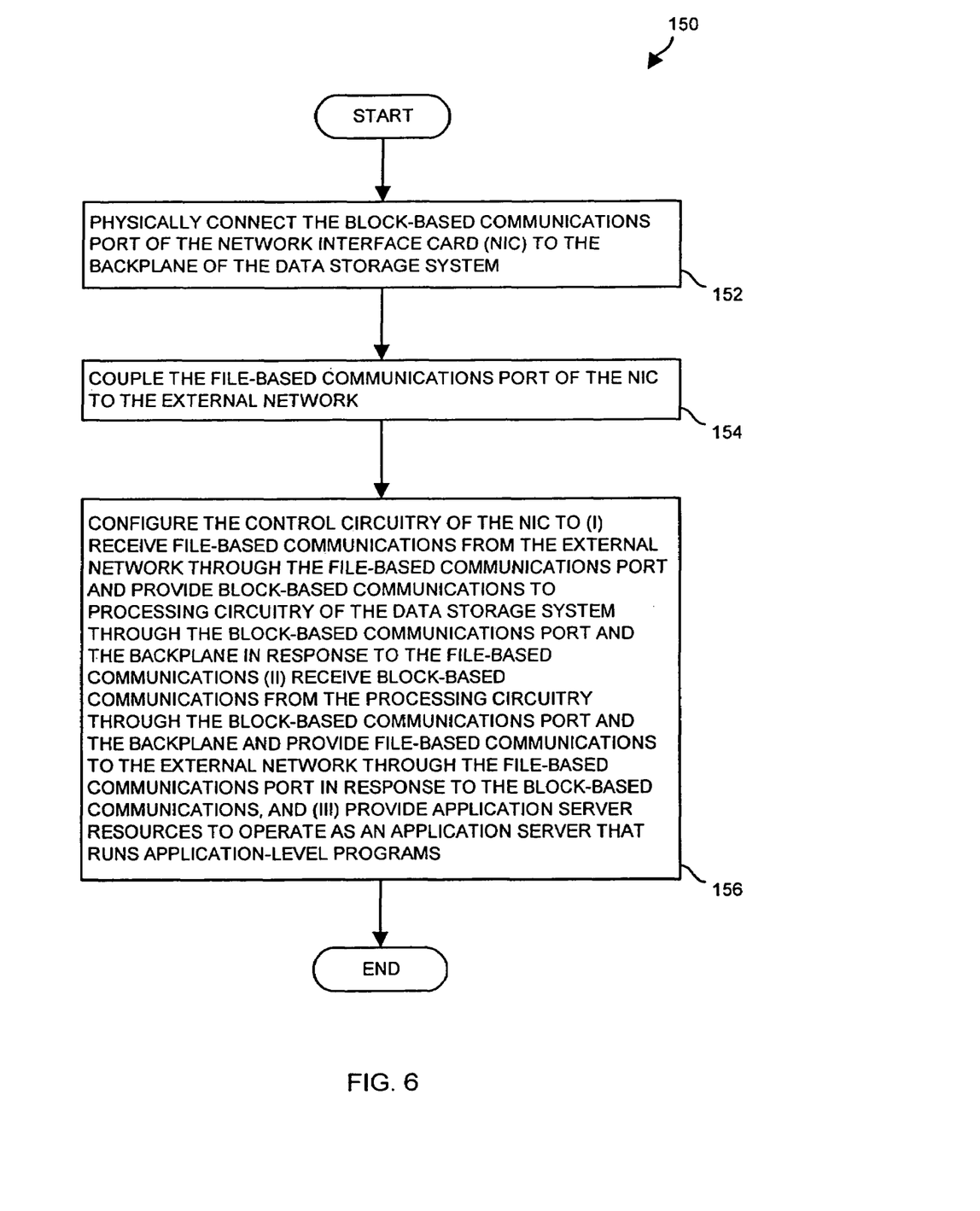
FIG. 6 is a flowchart of a procedure which is performed by a user of the data storage system of FIG. 2.

FIG. 6 shows a flowchart of a procedure 150 performed by a user of the data storage system 50 of FIGS. 2 through 5. In step 152, the user physically connects the port 86 of the NIC 54 to the data storage system backplane 104 (also see FIG. 4). In one arrangement, the user inserts the NIC 54 into a slot of a card cage so that the backplane connector of the port 86 engages, or mates with, a corresponding connector of the backplane 104.

In step 154, the user couples the port 84 of the NIC 54 to the external network 26 (also see FIG. 2). In one arrangement, the user plugs in network cable leading to the external network 26 into the port 84 of the NIC 54 (also see FIG. 4).

In step 156, the user configures the control circuitry 72 of the NIC 54 to (i) receive file-based communications from the external network 26 through the port 84 and provide block-based communications to the processing circuitry 106 of the data storage system through the port 86 and the backplane 104 in response to the received file-based communications, and (ii) receive block-based communications from the processing circuitry 106 through the port 86 and the backplane 104 and provide file-based communications to the external network 26 through the port 84 in response to the received block-based communications. Additionally, the user configures the control circuitry 72 to provide application server resources to operate as an application server that runs application-level programs (e.g., the application 138 of FIG. 5).

It should be understood that the user can repeat the procedure 150 for multiple NICs 54 in order to configure the NICs 54 to operate as a multiprocessor system. To this end, when the user physically connects the NICs 54 to the backplane 104 in step 162, the user preferably connects the control circuitry 72 of each NIC 54 together through respective connections 142 (see FIG. 5). In one arrangement, the connection 142 of each NIC 54 is in the backplane connector of the port 86 for that NIC 54. Further details of the invention will now be provided with reference to FIG. 7.

Figure 7:
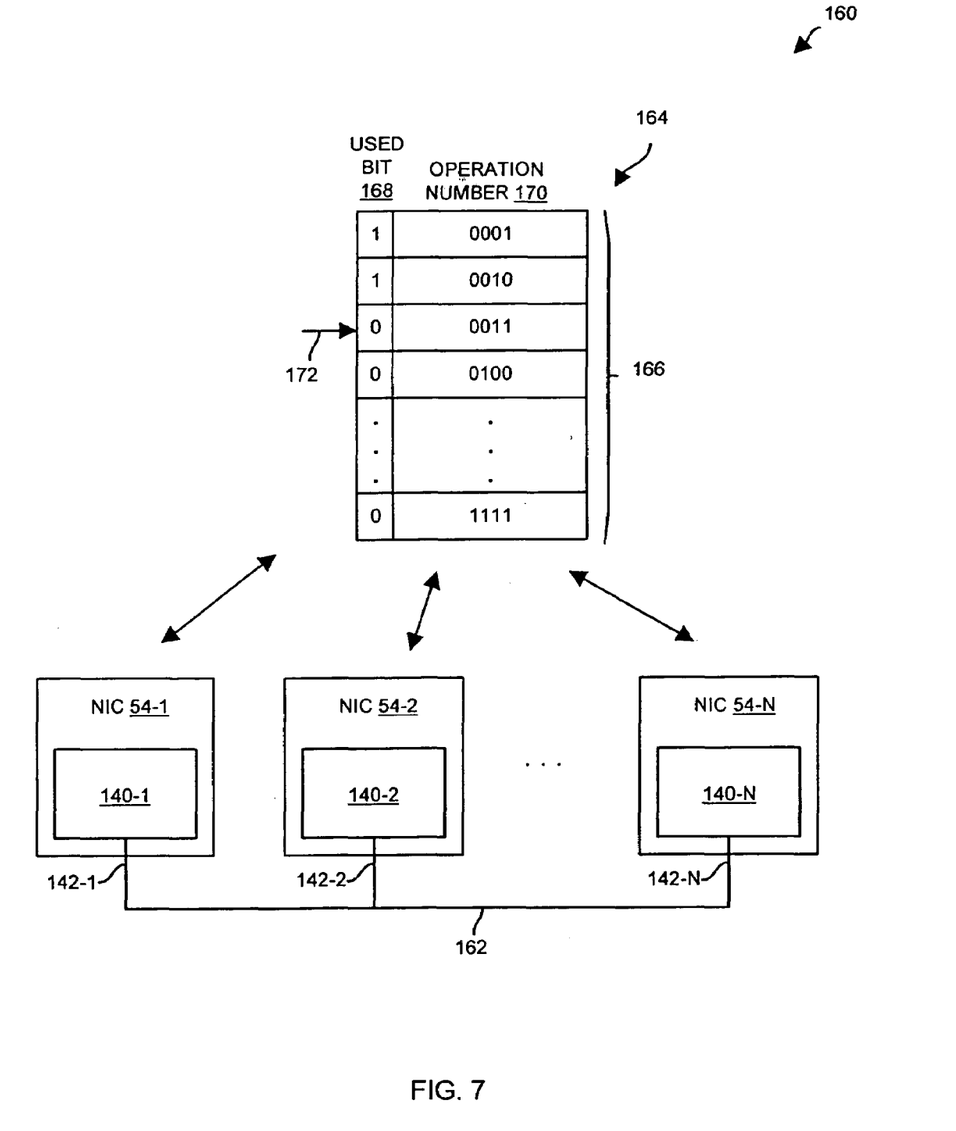
FIG. 7 is a block diagram of multiple network interface cards of the data storage of FIG. 2 which are arranged to form a multiprocessing system.

FIG. 7 shows how the operation number hardware 140 of each NIC 54 connects together through a connection 162 within the backplane 104. The operation number hardware 140 for each NIC 54 coordinate operations through this connection 162. In particular, each operation number hardware 140 accesses a respective table 164 of operation numbers within the support logic 126 of that NIC 54. Each table 164 includes an identical set of entries 166 having used bit fields 168 and operation number fields 170. The support logic 126 of each NIC 54 accesses its respective table 164 in order to associate operation numbers to operations performed by the processor 122 of that NIC 54 in a distinguishing fashion (i.e., a number that is unique at any given time). In one arrangement, the operation number hardware 140 uses pointers 172 which step through the table 164 to find an available operation number.

As described above, the invention is directed to data storage system techniques which utilize a NIC 54 that is capable of operating as (i) an interface between file-based and block-based communications, and (ii) an application server that runs application-level programs. There is no need for an external server to translate file-based communications to block-based communications and vice versa since the NIC 54 is capable of operating as an interface between file-based and block-based communications. Additionally, the data storage system can perform application-level operations (e.g., operate as a database engine that performs database queries) since the NIC 54 is capable of operating as an application server that runs application-level programs. Accordingly, for a data storage system utilizing such a NIC, there is no need for one or more external servers to operate as a front-end to the data storage system (e.g., as required by the conventional data storage system configuration 20 of FIG. 1). The features of the invention, as described above, may be employed in computer systems, components and procedures such as those of EMC Corporation of Hopkinton, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the port 84 of the NIC 54 was described above as connecting to a Gigabit Ethernet network (see the external network 26 of FIG. 5) by way of example only. Other types of networks are suitable for use as the external network 26 as well, such as token ring, ATM, etc.

Additionally, it should be understood that the ports 86 of the NICs were described above as handling Fibre Channel communications by way of example only. Other block-based communications are suitable for use as well such as ESCON, FICON, Block Mux, SCSI, etc. Moreover, the interface between the NICs 54 and the processing circuitry 106 (see FIG. 4) can use conventional bus architectures such as the Peripheral Component Interconnect (PCI) bus, the Industry Standard Architecture (ISA) bus, and the like.

Furthermore, it should be understood that the data storage system 50 was described above as including multiple NICs 54-1, . . . , 54-N, (N being a positive integer) by way of example only. It should be understood that the data storage system 50 can include a single NIC as well. The single NIC configuration still alleviates the need for an external server.

Additionally, it should be understood that the NICs 54 can run a variety of application-level programs and/or multiple application-level programs simultaneously. Accordingly, the data storage system 50 can provide a variety of server-level features such as operate as a database engine to one or more databases, operate as a web server, operate as an NFS file server, etc.

Furthermore, it should be understood that the topology of the data storage system 50 included a bus 70 for connecting the front-end circuitry 56, the cache 58 and the back-end circuitry 60 together by way of example only. Other topologies are suitable as well such as a matrix of point-to-point connections between director boards and memory boards which form the front-end circuitry 56, the cache 58 and the back-end circuitry 60.

Additionally, it should be understood that the storage devices 62 were described above as disk drives by way of example only. Other types of storage devices are suitable as well such as tape drives, CD-ROM drives, semiconductor memory, and the like.

Furthermore, it should be understood that the hardware 140 of each NIC 54 was described above as cycling through a table 164 of distinguishing numbers by way of example only. Other schemes for generating distinguishing or unique numbers are suitable for use as well such as passing a token or arbitration key among the NICs 54, stepping through a list of numbers, running counters, etc. In one arrangement, the operation number hardware 140 of the NICs 54 perform token passing operations for the purposes of making distinguishing numbers on the data storage system 50. Preferably, the such token passing is implemented exclusively in hardware for speed and reliability purposes. In one arrangement, the operation number hardware 140 of the NICs 54 connects in a ring configuration, and the token passing occurs over the ring configuration. In another arrangement, the operation number hardware 140 of the NICs 54 connects in bus configuration, and the token passing occurs over the bus configuration. Such modifications and enhancements are intended to be within the scope of various embodiments of the invention.

What is claimed is:

1. A network interface card for a data storage system having a backplane and processing circuitry for performing block-based data access operations, the processing circuitry of the data storage system being physically connected to the backplane of the data storage system, the network interface card comprising:
   a first port that is capable of coupling to an external network;
   a second port that is capable of physically connecting to the backplane of the data storage system; and
   control circuitry interconnected between the first port and the second port, the control circuitry being configured to, when the first port couples to the external network and the second port physically connects to the backplane of the data storage system:
      (i) receive file-based communications from the external network through the first port and provide block-based communications to the processing circuitry of the data storage system through the second port and the backplane in response to the file-based communications,
      (ii) receive block-based communications from the processing circuitry through the second port and the backplane and provide file-based communications to the external network through the first port in response to the block-based communications, and
      (iii) provide application server resources to operate as an application server that runs application-level programs;
   wherein the second port includes:
      (i) a set of data pathway conductors that forms, between the control circuitry and the processing circuitry, a portion of a data pathway to carry data for storage within the data storage system, and
      (ii) a set of message pathway conductors that forms, between the control circuitry and the processing circuitry, a portion of a message pathway to carry messages for controlling storage of the data.

2. The network interface card of claim 1 wherein the set of data pathway conductors forms, between the control circuitry and the processing circuitry, a portion of a Fibre Channel bus.

3. The network interface card of claim 1 wherein the control circuitry is configured to exchange (i) Internet Protocol communications with the external network through the first port, and (ii) block-based communications with the processing circuitry of the data storage system through the second port and the backplane of the data storage system.

4. The network interface card of claim 3 wherein the control circuitry includes a map which maps filenames with blocks of a set of data storage devices of the data storage system, and wherein the control circuitry is further configured to receive a file-based Internet Protocol data access request from the external network and to access a block of data within the data storage system based on the file-based Internet Protocol data access request and the map.

5. The network interface card of claim 1 wherein the control circuitry is configured to operate as a processor of a multiprocessor system which simultaneously performs multiple application-level operations.

6. The network interface card of claim 5 wherein the control circuitry includes a hardware circuit that associates, with each application-level operation, a number that distinguishes that application-level operation among the multiple application-level operations simultaneously performed by the multiprocessor system.

7. The network interface card of claim 1 wherein the processing circuitry of the data storage system includes a set of front-end directors, a cache, and a set of back-end directors; wherein the set of front-end directors is configured to operate as an interface between the network interface card and the cache; wherein the set of back-end directors is configured to operate as an interface between the cache and a set of storage devices; and wherein the network interface card, in combination with the processing circuitry, is configured to form at least a portion of a common pathway between the external network and the set of storage devices.

8. A network interface card for a data storage system having a backplane and processing circuitry for performing block-based data access operations, the processing circuitry of the data storage system being physically connected to the backplane of the data storage system, the network interface card comprising:
   a first port that is capable of coupling to an external network;
   a second port that is capable of physically connecting to the backplane of the data storage system; and
   control circuitry interconnected between the first port and the second port, the control circuitry being configured to, when the first port couples to the external network and the second port physically connects to the backplane of the data storage system:
      (i) receive file-based communications from the external network through the first port and provide block-based communications to the processing circuitry of the data storage system through the second port and the backplane in response to the file-based communications,
      (ii) receive block-based communications from the processing circuitry through the second port and the backplane and provide file-based communications to the external network through the first port in response to the block-based communications, and (iii) provide application server resources to operate as an application server that runs application-level programs;

wherein the control circuitry includes a section of circuit board material and a processor which is physically mounted to the section of circuit board material, the processor being configured to move data between the first and second ports; and wherein the second port includes a backplane connector which is physically mounted to the section of circuit board material, the backplane connector being capable of mating with the backplane of the data storage system.

9. The network interface card of claim 8 wherein the control circuitry further includes memory which is physically mounted to the section of circuit board material, the memory being configured to buffer data moving between the first and second ports when the first port couples to the external network and the backplane connector mates with the backplane of the data storage system.

10. In a data storage system having a backplane and processing circuitry for performing block-based data access operations, a method comprising the steps of:

coupling a first port of a network interface card to an external network;

physically connecting a second port of the network interface card to the backplane of the data storage system; and configuring control circuitry of the network interface card to:

(i) receive file-based communications from the external network through the first port and provide block-based communications to the processing circuitry of the data storage system through the second port and the backplane in response to the file-based communications, (ii) receive block-based communications from the processing circuitry through the second port and the backplane and provide file-based communications to the external network through the first port in response to the block-based communications, and (iii) provide application server resources to operate as an application server that runs application-level programs;

wherein the second port includes (i) a set of data pathway conductors that forms, between the control circuitry and the processing circuitry, a portion of a data pathway to carry data between the control circuitry and the processing circuitry, and (ii) a set of message pathway conductors that forms, between the control circuitry and the processing circuitry, a portion of a message pathway to carry messages between the control circuitry and the processing circuitry; and wherein the method further comprises the steps of:

exchanging, between the control circuitry and the processing circuitry and through the portion of the data pathway, data for storage within the data storage system, and exchanging, between the control circuitry and the processing circuitry and through the portion of the message pathway, messages for controlling storage of the data.

11. The method of claim 10 wherein the set of data pathway conductors forms, between the control circuitry and the processing circuitry, a portion of a Fibre Channel bus, and wherein the step of exchanging data between the control circuitry and the processing circuitry includes the step of:

passing the data through the portion of the Fibre Channel bus formed by the set of data pathway conductors.

12. The method of claim 10 wherein the step of receiving the file-based communications and providing the block-based communications includes the step of obtaining Internet Protocol communications from the external network through the first port; and wherein the step of receiving the block-based communications and providing the file-based communications includes the step of sending Internet Protocol communications to the external network through the first port.

13. The method of claim 12 wherein the control circuitry includes a map which maps filenames with blocks of a set of data storage devices of the data storage system; and wherein the step of receiving the file-based communications and providing the block-based communications further includes the step of:

accessing a block of data within the data storage system based on a file-based Internet Protocol data access request obtained from the external network through the first port and the map.

14. The method of claim 10 wherein the step of configuring the control circuitry further includes the step of:

setting up the control circuitry to operate as a processor of a multiprocessor system which simultaneously performs multiple application-level operations.

15. The method of claim 14 wherein the control circuitry includes a hardware circuit, and wherein the step of setting up the control circuitry includes the step of:

activating the hardware circuit to associate, with each application-level operation, a number that distinguishes that application-level operation among the multiple application-level operations simultaneously performed by the multiprocessor system.

16. The method of claim 10 wherein the processing circuitry of the data storage system includes a set of front-end directors, a cache, and a set of back-end directors; wherein the set of front-end directors is configured to operate as an interface between the network interface card and the cache; wherein the set of back-end directors is configured to operate as an interface between the cache and a set of storage devices; and wherein the step of physically connecting the second port of the network interface card to the backplane of the data storage system includes the step of:

forming, in combination with the processing circuitry, at least a portion of a common pathway between the external network and the set of storage devices.

17. In a data storage system having a backplane and processing circuitry for performing block-based data access operations, a method comprising the steps of:

coupling a first port of a network interface card to an external network;

physically connecting a second port of the network interface card to the backplane of the data storage system; and configuring control circuitry of the network interface card to:

(i) receive file-based communications from the external network through the first port and provide block-based communications to the processing circuitry of the data storage system through the second port and the backplane in response to the file-based communications, (ii) receive block-based communications from the processing circuitry through the second port and the backplane and provide file-based communications to the external network through the first port in response to the block-based communications, and (iii) provide application server resources to operate as an application server that runs application-level programs;

wherein the control circuitry includes a section of circuit board material and a processor which is physically mounted to the section of circuit board material, the processor being configured to move data between the first and second ports; wherein the second port includes a backplane connector which is physically mounted to the section of circuit board material; and wherein the step of physically connecting the second port includes the step of mating the backplane connector with the backplane of the data storage system.

18. The method of claim 17, wherein the control circuitry further includes memory, and wherein the method further comprises the step of buffering data moving between the first and second ports.

19. A data storage system, comprising:

a backplane;

processing circuitry that is physically connected to the backplane, the processing circuitry being configured to perform block-based data access operations; and a network interface card having a first port that is capable of coupling to an external network, a second port that is physically connected to the backplane, and control circuitry interconnected between the first port and the second port, the control circuitry being configured to:

(i) receive file-based communications from the external network through the first port and provide block-based communications to the processing circuitry through the second port and the backplane in response to the file-based communications, (ii) receive block-based communications from the processing circuitry through the second port and the backplane and provide file-based communications to the external network through the first port in response to the block-based communications, and (iii) provide application server resources to operate as an application server that runs application-level programs, wherein the second port of the network interface card includes:

(i) a set of data pathway conductors that forms, between the control circuitry and the processing circuitry, a portion of a data pathway to carry data for storage within the data storage system, and (ii) a set of message pathway conductors that forms, between the control circuitry and the processing circuitry, a portion of a message pathway to carry messages for controlling storage of the data.

20. The data storage system of claim 19, further comprising:

another network interface card having a third port that is capable of coupling to the external network, a fourth port that is physically connected to the backplane, and control circuitry interconnected between the third port and the fourth port, the control circuitry of the other network interface card being configured to:

(i) receive other file-based communications from the external network through the third port and provide block-based communications to the processing circuitry through the fourth port and the backplane in response to the other file-based communications, (ii) receive other block-based communications from the processing circuitry through the fourth port and the backplane and provide file-based communications to the external network through the third port in response to the other block-based communications, and (iii) provide other application server resources to operate as another application server that runs application-level programs in a multiprocessing manner.

21. The data storage system of claim 19 wherein the control circuitry of the network interface card includes a section of circuit board material and a processor which is physically mounted to the section of circuit board material, the processor being configured to move data between the first and second ports; and wherein the second port includes a backplane connector which is physically mounted to the section of circuit board material, the backplane connector being capable of mating with the backplane of the data storage system.

22. The data storage system of claim 19 wherein the processing circuitry includes a set of front-end directors, a cache, and a set of back-end directors; wherein the set of front-end directors is configured to operate as an interface between the network interface card and the cache; and wherein the set of back-end directors is configured to operate as an interface between the cache and a set of storage devices; and wherein the network interface card, in combination with the processing circuitry, is configured to form at least a portion of a common pathway between the external network and the set of storage devices.

* * * * *